US010928281B2

(12) United States Patent
Iwakiri et al.

(10) Patent No.: US 10,928,281 B2
(45) Date of Patent: Feb. 23, 2021

(54) MATERIAL TESTING MACHINE AND GRIPPING FORCE DETECTING METHOD

(71) Applicant: SHIMADZU CORPORATION, Kyoto (JP)

(72) Inventors: Shogoro Iwakiri, Kyoto (JP); Zen Miyazaki, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 199 days.

(21) Appl. No.: 16/166,185

(22) Filed: Oct. 22, 2018

(65) Prior Publication Data

US 2019/0154554 A1 May 23, 2019

(30) Foreign Application Priority Data

Nov. 22, 2017 (JP) .............................. JP2017-224874

(51) Int. Cl.
*G01N 3/08* (2006.01)
*G01N 3/04* (2006.01)
*G01N 29/44* (2006.01)
*G01N 3/06* (2006.01)
*G01H 13/00* (2006.01)
(Continued)

(52) U.S. Cl.
CPC ............... *G01N 3/04* (2013.01); *G01H 13/00* (2013.01); *G01N 3/066* (2013.01); *G01N 3/08* (2013.01); *G01N 3/30* (2013.01); *G01N 3/62* (2013.01); *G01N 29/12* (2013.01); *G01N 29/4427* (2013.01); *G01N 3/22* (2013.01); *G01N 2203/0482* (2013.01); *G01N 2203/0688* (2013.01)

(58) Field of Classification Search
CPC .. G01N 3/08; G01N 3/22; G01N 3/30; G01N 3/62; G01N 13/00; G01N 29/12; G01N 29/4427; G01N 2203/04; G01N 2203/0482; G01N 2203/0688; G01H 13/00
See application file for complete search history.

(56) References Cited

U.S. PATENT DOCUMENTS 3,306,100 A  *  2/1967  Wilhelm ................. G01L 5/246
                                            73/581
3,751,977 A  *  8/1973  Schilling, Jr. ........ G01N 29/043
                                            73/579

(Continued)

FOREIGN PATENT DOCUMENTS

JP          2002139411          5/2002

*Primary Examiner* — David J Bolduc
(74) *Attorney, Agent, or Firm* — JCIPRNET

(57) ABSTRACT

Provided are a material testing machine and a gripping force detecting method that can easily judge whether a test piece is gripped with an appropriate gripping force by a gripper. A controlling section is connected to a FFT transforming section via a load cell; the FFT transforming section calculates a natural frequency of a system comprising a test piece and an upper gripper which is connected to a load cell based on a detected value of a force of the load cell. In addition, the controlling section is connected to a storing section which stores the natural frequency calculated by the FFT transforming section. Furthermore, the controlling section is also connected to a comparing section which compares the natural frequency calculated by the FFT transforming section and the natural frequency stored by the storing section before a test starts.

4 Claims, 6 Drawing Sheets

(51) Int. Cl.
  *G01N 3/62* (2006.01)
  *G01N 3/30* (2006.01)
  *G01N 29/12* (2006.01)
  *G01N 3/22* (2006.01)

(56) References Cited

U.S. PATENT DOCUMENTS

| | | | | |
|---|---|---|---|---|
| 3,777,557 A * | 12/1973 | Dunlap | .................... | G01N 3/08 |
| | | | | 73/772 |
| 4,096,741 A * | 6/1978 | Sternstein | ................ | G01N 3/08 |
| | | | | 73/789 |
| 4,426,875 A * | 1/1984 | Crosby, Jr. | ................ | G01N 3/08 |
| | | | | 73/12.13 |
| 4,667,095 A * | 5/1987 | Hatanaka | ................ | G01N 3/068 |
| | | | | 250/226 |
| 4,821,579 A * | 4/1989 | Gernhart | ................ | G01N 3/04 |
| | | | | 73/834 |
| 4,856,342 A * | 8/1989 | Bottenbruch | .......... | G01N 19/04 |
| | | | | 73/827 |
| 4,864,865 A * | 9/1989 | Stoakley | ................ | G01N 3/04 |
| | | | | 73/831 |
| 5,242,512 A * | 9/1993 | Bagley | ................ | G01N 29/12 |
| | | | | 148/558 |
| 5,263,373 A * | 11/1993 | Wakabayashi | ........... | G01N 3/16 |
| | | | | 73/788 |
| 5,269,181 A * | 12/1993 | Gibson | ................ | G01N 3/317 |
| | | | | 73/160 |
| 5,533,399 A * | 7/1996 | Gibson | ................ | G01H 5/00 |
| | | | | 73/579 |
| 5,554,807 A * | 9/1996 | Tranquilla | ............... | G01N 3/00 |
| | | | | 73/11.04 |
| 5,596,901 A * | 1/1997 | Gloor | ................ | G01B 11/08 |
| | | | | 73/159 |
| 5,694,807 A * | 12/1997 | Hinkley | ................ | D01H 13/26 |
| | | | | 73/159 |
| 5,798,456 A * | 8/1998 | Tranquilla | .......... | G01M 13/023 |
| | | | | 73/159 |
| 5,842,373 A * | 12/1998 | Stein | ........................ | G01N 3/08 |
| | | | | 73/160 |
| 6,318,166 B1 * | 11/2001 | Roos | ........................ | G01N 3/08 |
| | | | | 73/160 |
| 6,578,423 B2 * | 6/2003 | Fischer | .................. | G01N 29/12 |
| | | | | 73/630 |
| 6,665,483 B2 * | 12/2003 | Gatica | ................ | G02B 6/02152 |
| | | | | 385/136 |
| 6,778,914 B1 * | 8/2004 | Gillespie, Jr. | ............ | G01N 3/24 |
| | | | | 702/34 |
| 7,143,642 B1 * | 12/2006 | Baxter | ................ | G01N 33/362 |
| | | | | 73/159 |
| 7,313,971 B2 * | 1/2008 | Kawano | ................ | G01N 3/066 |
| | | | | 73/788 |
| 8,863,583 B2 * | 10/2014 | Fukuda | .................... | G01N 3/04 |
| | | | | 73/800 |
| 8,863,584 B2 * | 10/2014 | Kawano | ................ | G01N 3/08 |
| | | | | 73/788 |
| 9,506,849 B2 * | 11/2016 | Kaneda | ................ | G01N 3/04 |
| 9,677,982 B2 * | 6/2017 | Komine | ................ | G01N 3/04 |
| 2003/0106376 A1 * | 6/2003 | Shirzad | ............. | G01N 29/2418 |
| | | | | 73/606 |
| 2003/0188585 A1 * | 10/2003 | Esser | ....................... | G01N 3/38 |
| | | | | 73/826 |
| 2007/0151341 A1 * | 7/2007 | Mazza | .................... | G01N 3/32 |
| | | | | 73/579 |
| 2011/0167922 A1 * | 7/2011 | Krause | ................... | G01N 3/04 |
| | | | | 73/808 |
| 2012/0133448 A1 * | 5/2012 | Gregg | ..................... | G01N 3/32 |
| | | | | 331/116 R |
| 2013/0000381 A1 * | 1/2013 | Lee | ......................... | G01N 3/30 |
| | | | | 73/12.09 |
| 2014/0123773 A1 * | 5/2014 | Lemmer | ................ | G01N 3/04 |
| | | | | 73/863.01 |
| 2017/0040913 A1 * | 2/2017 | Bucher | ................ | H03H 9/46 |
| 2017/0097280 A1 * | 4/2017 | Drescher | ............... | G01M 7/022 |
| 2018/0259334 A1 * | 9/2018 | Moriguchi | ........ | G01C 19/5677 |
| 2019/0017912 A1 * | 1/2019 | Farhad | .................. | G01B 11/16 |
| 2019/0234793 A1 * | 8/2019 | Matsuura | ............... | G01M 1/14 |
| 2019/0234849 A1 * | 8/2019 | Matsuura | ............... | G01N 3/30 |

* cited by examiner

MATERIAL TESTING MACHINE AND GRIPPING FORCE DETECTING METHOD

CROSS REFERENCE TO RELATED APPLICATIONS

This application claims the priority benefit of Japanese Patent Application No. 2017-224874, filed on Nov. 22, 2017. The entirety of the above-mentioned patent application is hereby incorporated by reference herein and made a part of this specification.

BACKGROUND

Technical Field

The disclosure relates to a material testing machine that conducts a tensile test by applying a tensile test force to a test piece in a state when both ends of the test piece are gripped by a pair of grippers, and to a gripping force detecting method of the material testing machine.

Related Art

A gripper which is used in such a material testing machine is formed into, for example, a structure in which a pair of gripper teeth which sandwiches a test piece is moved by rotation of a nut and the test piece is fixed to the gripper. In the gripper which has such a structure, a gripping force of the gripper to the test piece is proportional to a magnitude of a torque when the nut is rotated (see patent literature 1: Japanese Laid-open No. 2002-139411).

In such a material testing machine, if a material test cannot be conducted in a state when a test piece is gripped with an appropriate gripping force by the gripper, a correct test result cannot be obtained. However, whether the test piece is gripped with the appropriate gripping force is difficult to be confirmed, and only when the test result is confirmed, or a surface of a gripped area in the test piece is confirmed visually after the material test is over, can it be confirmed whether the test piece is appropriately gripped.

In addition, when the test piece is gripped by the gripper, it is not impossible to measure the gripping force by using a torque wrench and the like; however, the operation is extremely complex, and variations are likely to be caused by operators.

SUMMARY

The disclosure provides a material testing machine which has a simple structure and can judge whether a test piece is gripped with an appropriate gripping force by a gripper, and a gripping force detecting method.

The embodiment of the disclosure provides a material testing machine which conducts a tensile test by applying a tensile test force to a test piece in a state when both ends of the test piece are gripped by a pair of grippers, and the material testing machine includes: a storing section, which stores an appropriate natural frequency, wherein a natural frequency of a system including the test piece and one of the pair of grippers when the test piece is gripped with an appropriate gripping force by the one gripper is served as the appropriate natural frequency; a before-test natural frequency measuring means, which measures a before-test natural frequency, wherein a natural frequency of the system including the test piece and the one gripper when the test piece is gripped by the one gripper before the tensile test starts is served as the before-test natural frequency; and a comparing section, which compares the before-test natural frequency with the appropriate natural frequency.

The embodiment of the disclosure provides a material testing machine which conducts a tensile test by applying a tensile test force to a test piece in a state when both ends of the test piece are gripped by a pair of grippers, and measuring the tensile test force with a force detector which is connected to one of the pair of grippers, and the material testing machine includes: a calculating section, which calculates a natural frequency of a system including the test piece and the gripper connected to the force detector, based on a detected value of a force of the force detector when the gripper connected to the force detector is batted; a storing section, which stores an appropriate natural frequency, wherein a natural frequency, calculated by the calculating section, of the system including the test piece and the gripper connected to the force detector when the gripper connected to the force detector is batted in a state when the test piece is gripped with an appropriate gripping force by the gripper connected to the force detector is served as the appropriate natural frequency; and a comparing section compares a before-test natural frequency with the appropriate natural frequency which is stored in the storing section, wherein a natural frequency, calculated by the calculating section, of the system including the test piece and the gripper connected to the force detector when the gripper connected to the force detector is batted in a state when the test piece is gripped by the gripper connected to the force detector before the tensile test starts is served as the before-test natural frequency.

The embodiment of the disclosure provides a gripping force detecting method which detects whether a test piece is gripped with an appropriate gripping force by a pair of grippers in a material testing machine, which conducts a tensile test by applying a tensile test force to the test piece in a state when both ends of the test piece are gripped by the grippers, and the gripping force detecting method includes: an appropriate natural frequency storing process of storing an appropriate natural frequency, wherein a natural frequency of a system including the test piece and one of the pair of grippers when the test piece is gripped with an appropriate gripping force by the one gripper is served as the appropriate natural frequency; a before-test natural frequency measuring process of measuring a before-test natural frequency, wherein a natural frequency of the system including the test piece and the one gripper when the test piece is gripped by the one gripper before the tensile test starts is served as the before-test natural frequency; and a comparing process of comparing the before-test natural frequency with the appropriate natural frequency.

The embodiment of the disclosure provides a gripping force detecting method which detects whether a test piece is gripped with an appropriate gripping force by a pair of grippers in a material testing machine, which conducts a tensile test by applying a tensile test force to the test piece in a state when both ends of the test piece are gripped by the pair of grippers, and by measuring the tensile test force with a force detector which is connected to one of the pair of grippers, and the gripping force detecting method includes: a first measuring process of measuring a detected value of the force of the force detector when the gripper connected to the force detector is batted in a state when the test piece is gripped with an appropriate gripping force by the gripper connected to the force detector; an appropriate natural frequency calculating process of calculating an appropriate natural frequency based on the detected value of the force of the force detector which is measured in the first measuring process, wherein a natural frequency of a system including the test piece and the gripper connected to the force detector is served as the appropriate natural frequency; a second measuring process of measuring a detected value of the force of the force detector when the gripper connected to the force detector is batted in a state when the test piece is gripped by the gripper connected to the force detector before the tensile test starts; a calculating process for a before-test natural frequency of calculating a before-test natural frequency based on the detected value of the force of the force detector which is measured in the second measuring process, wherein a natural frequency of the system including the test piece and the gripper connected to the force detector is served as the before-test natural frequency; and a comparing process of comparing the before-test natural frequency with the appropriate natural frequency.

BRIEF DESCRIPTION OF THE DRAWINGS

FIG. 6 is a graph which shows a relationship between a gripping force to a certain test piece and a natural frequency of a system including a test piece or a gripper and the like.

DESCRIPTION OF THE EMBODIMENTS

Figure 1:
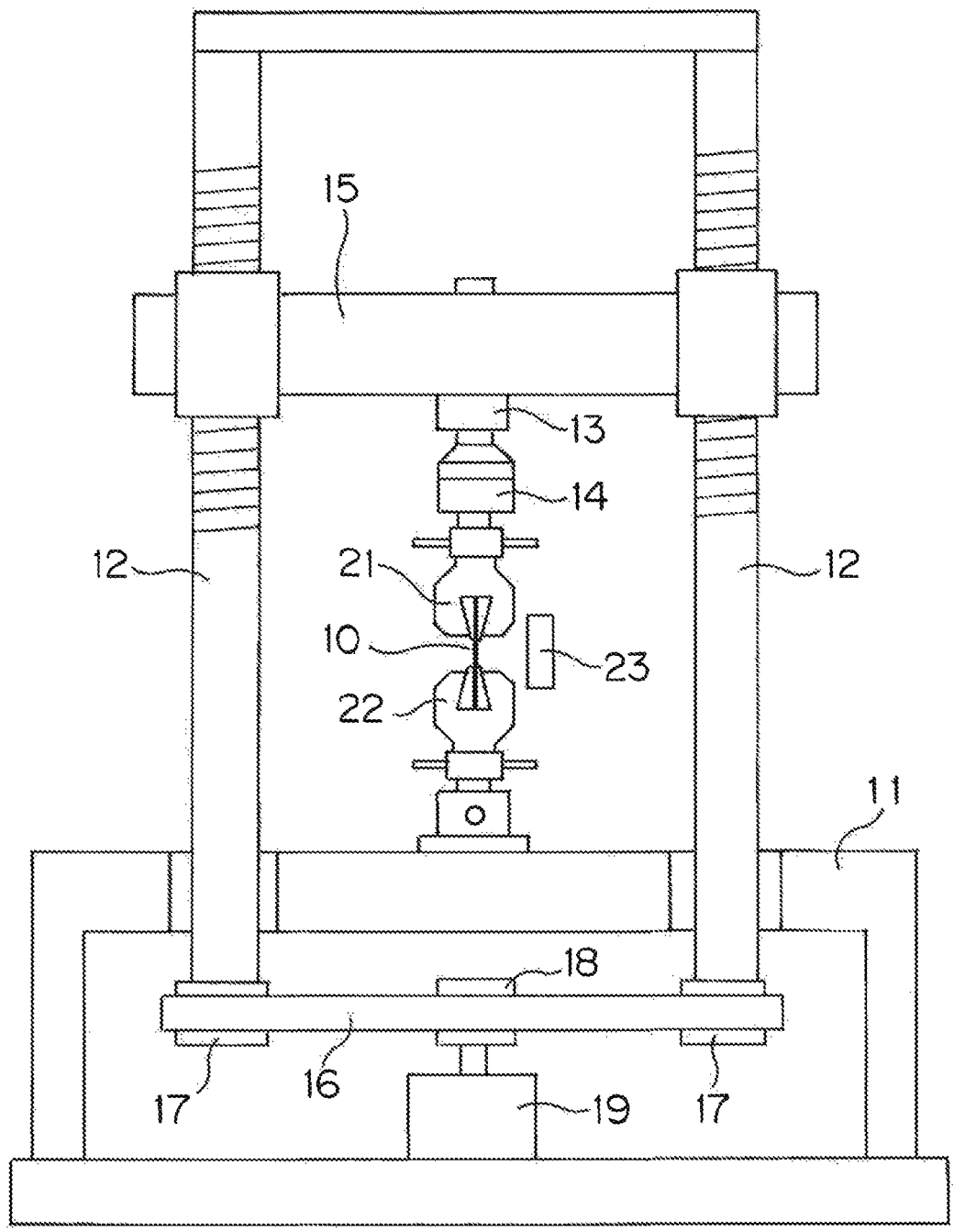
FIG. 1 is a schematic diagram of a material testing machine of an embodiment of the disclosure.

Next, embodiments of the disclosure are described based on drawings. FIG. 1 is a schematic view of a material testing machine of an embodiment of the disclosure.

The material testing machine conducts a tensile test to a test piece 10, includes a base 11, a pair of right and left screw rods 12 erected on the base 11, a nut section which is screwed to the pair of right and left screw rods 12, and a cross head 15 which moves up and down relative to the screw rods 12. On the cross head 15, an upper gripper 21 is arranged via an axis adjusting mechanism 13 and a load cell 14 which is a force detector. In addition, a lower gripper 22 is fixed to the base 11. Both ends of the test piece 10 are gripped by the upper gripper 21 and the lower gripper 22.

Synchronous pulleys 17 which are engaged with a synchronous belt 16 are respectively arranged on lower ends of the pair of screw rods 12. In addition, the synchronous belt 16 is also engaged with a synchronous pulley 18 which is rotated by the driving of a motor 19. Therefore, the pair of screw rods 12 rotates synchronously with the driving of the motor 19. In addition, due to the synchronous rotation of the pair of screw rods 12, the cross head 15 moves up and down in a direction of an axis of the pair of screw rods 12.

A test force which is loaded on the test piece 10 is detected by the load cell 14. In addition, an amount of displacement between gauge points up and down of the test piece 10 is detected by a contact or non-contact displacement gauge 23. Signals from the load cell 14 and the displacement gauge 23 are input into a controlling section 40 described below. The controlling section 40 generates a drive controlling signal of the motor 19 based on the signals from the load cell 14 and the displacement gauge 23. In this way, a rotation of the motor 19 is controlled, and the tensile test to the test piece 10 is conducted.

Figure 2:
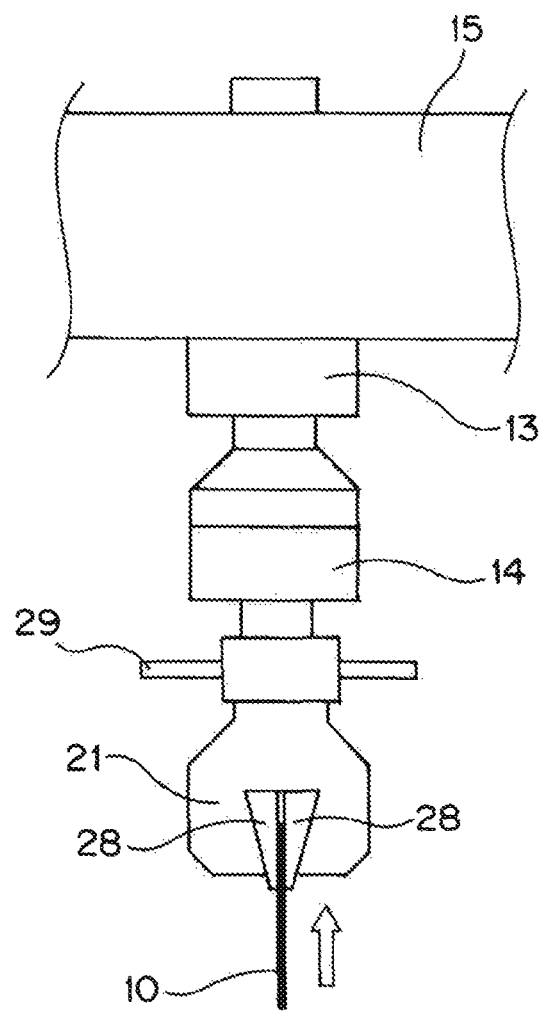
FIG. 2 is an enlarged view of the vicinity of an upper gripper 21.

FIG. 2 is an enlarged view of the vicinity of the upper gripper 21.

The upper gripper 21 includes a pair of gripper teeth 28 which grip the test piece 10 from both sides so as to clamp the test piece 10. A gripping force of the pair of gripper teeth 28 to the test piece 10 is adjusted by rotating a handle 29 in the upper gripper 21. Such a structure is a common structure as a gripper which grips a test piece by a manual operation in the material testing machine; for example, the same gripper structure is also described in patent literature 1 described above.

Figure 3:
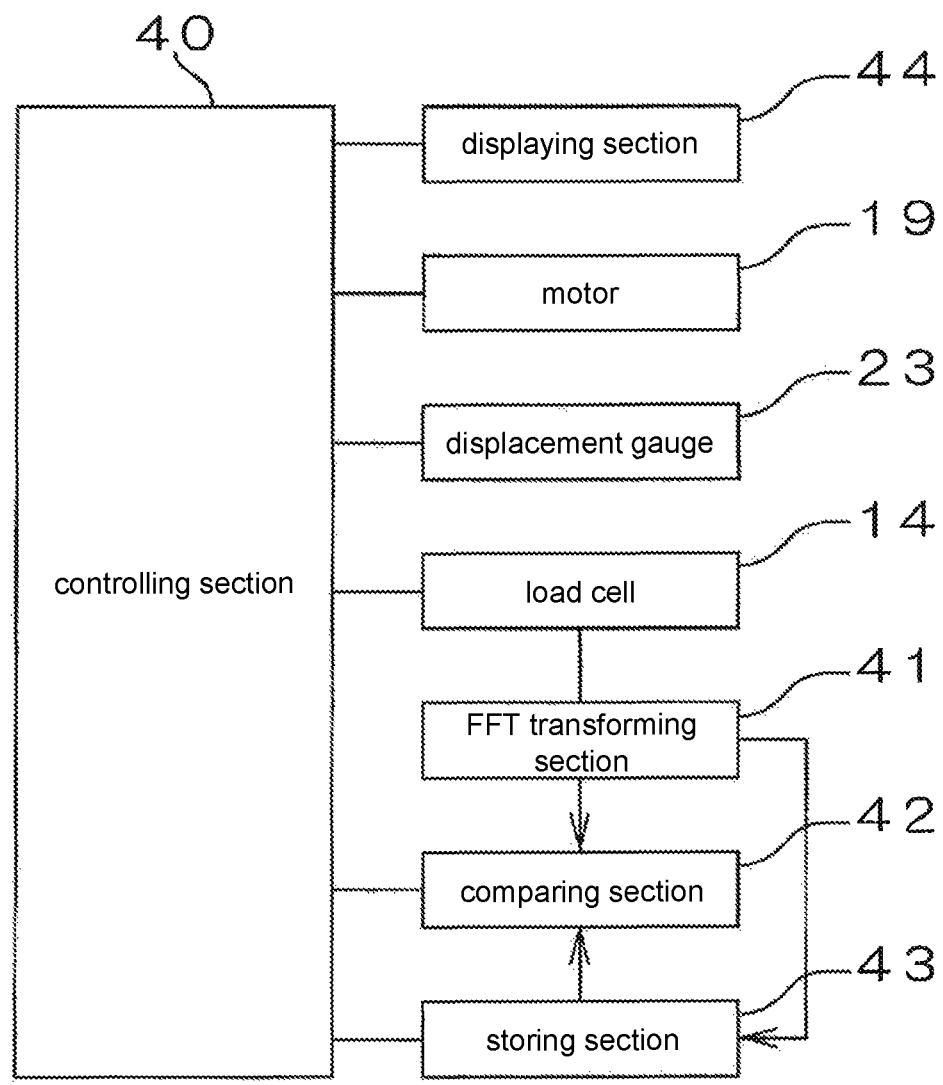
FIG. 3 is a block diagram which shows a main control system of the material testing machine of an embodiment of the disclosure.

FIG. 3 is a block diagram which shows a main control system of the material testing machine of an embodiment of the disclosure.

The material testing machine of the embodiment of the disclosure includes a controlling section 40 which has a processor and controls the whole device. The controlling section 40 is connected to the motor 19, the displacement gauge 23 and the load cell 14. In addition, the controlling section 40 is connected to a displaying section 44 which is configured by a LCD touch panel and the like that perform a display of various data and a warning display described below.

In addition, the controlling section 40 is connected to a FFT transforming section 41 via the load cell 14; the FFT transforming section 41 serves as a calculating section of the embodiment of the disclosure which calculates a natural frequency of a system including the test piece 10 and the upper gripper 21 connected to the load cell 14 based on a detected value of a force by the load cell 14. In addition, the controlling section 40 is connected to a storing section 43 which stores the natural frequency calculated by the FFT transforming section 41. Furthermore, the controlling section 40 is also connected to a comparing section 42; the comparing section 42 compares the natural frequency calculated by the FFT transforming section 41 before a test starts with the natural frequency stored in the storing section 43. Furthermore, the FFT transforming section 41, the comparing section 42, and the storing section 43 may also be contained in the controlling section 40 as a structure inside the controlling section 40.

Figure 4:
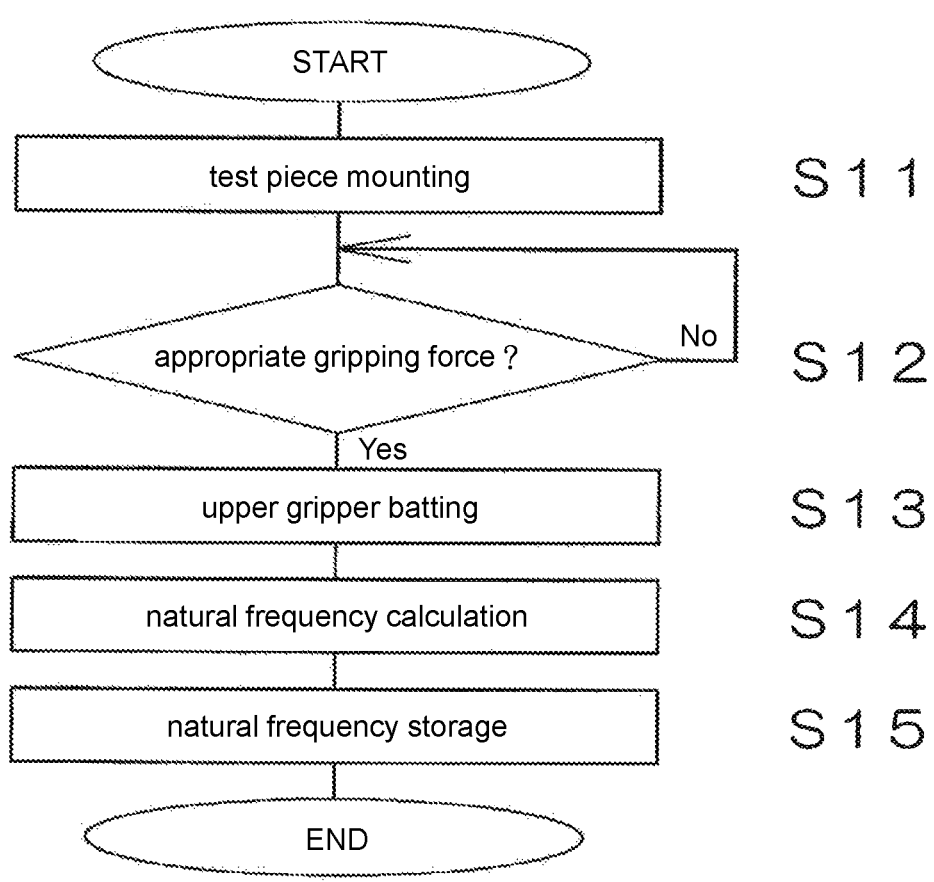
FIG. 4 is a flowchart which shows a movement when a tensile test is started by the material testing machine of an embodiment of the disclosure, and shows an appropriate natural frequency measuring process which measures a natural frequency.
Figure 5:
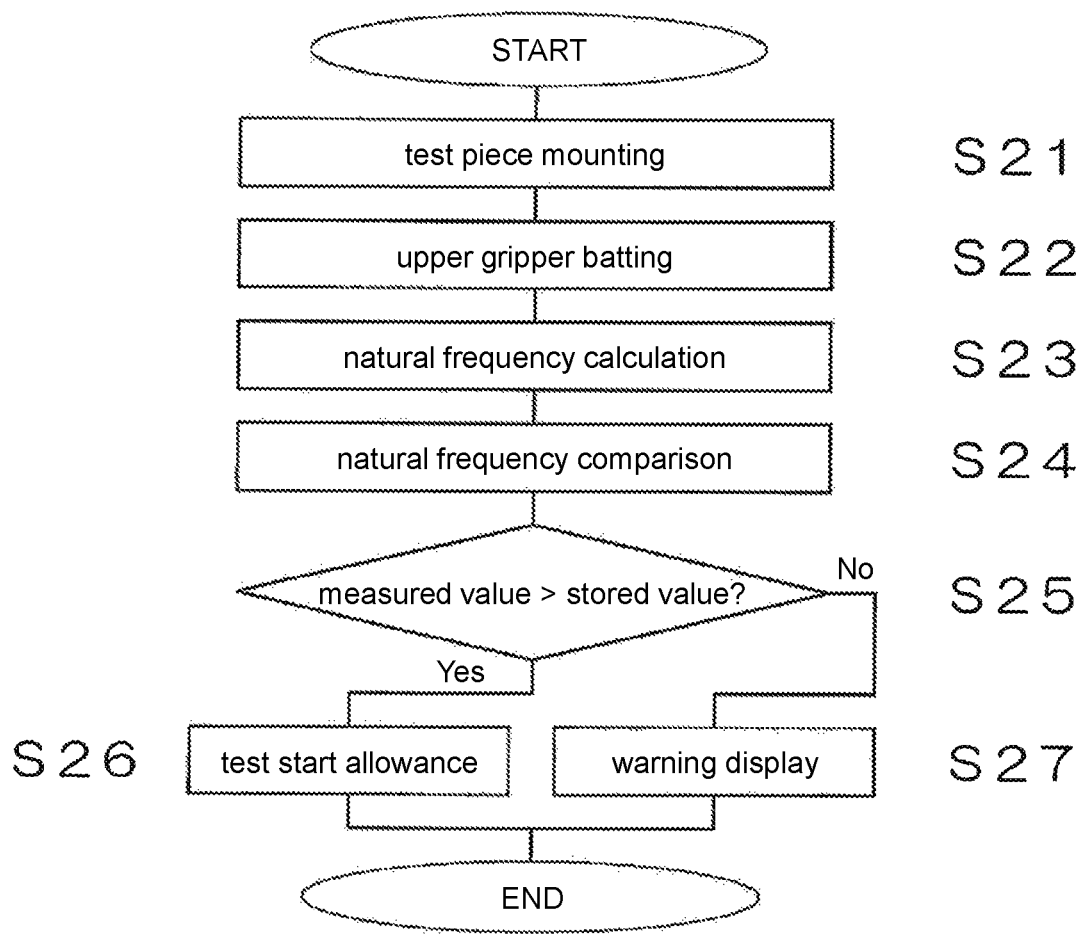
FIG. 5 is a flowchart which shows a movement when a tensile test is started by the material testing machine of an embodiment of the disclosure, and shows a before-test natural frequency measuring process which confirms whether the gripping is conducted with an appropriate gripping force.

Next, a movement when a material test is started by the material testing machine which has the structure above is described. FIG. 4 and FIG. 5 are flowcharts that show the movement when the tensile test is started by the material testing machine of an embodiment of the disclosure. Here, FIG. 4 shows an appropriate natural frequency measuring process which measures a natural frequency of a system including the test piece 10 and the upper gripper 21 connected to the load cell 14 when the test piece 10 is gripped with an appropriate gripping force by the upper gripper 21; FIG. 5 shows a before-test natural frequency measuring process which confirms whether the test piece 10 is gripped with the appropriate gripping force by the upper gripper 21.

In the appropriate natural frequency measuring process, an appropriate natural frequency is measured, wherein the natural frequency of the system including the test piece 10 and the upper gripper 21 connected to the load cell 14 when the test piece 10 is gripped with the appropriate gripping force by the upper gripper 21 is served as the appropriate natural frequency. The reason is that it is discover that when the test piece 10 is gripped with a great gripping force, the natural frequency of the system including the test piece 10 and the upper gripper 21 connected to the load cell 14 also becomes greater.

Figure 6:
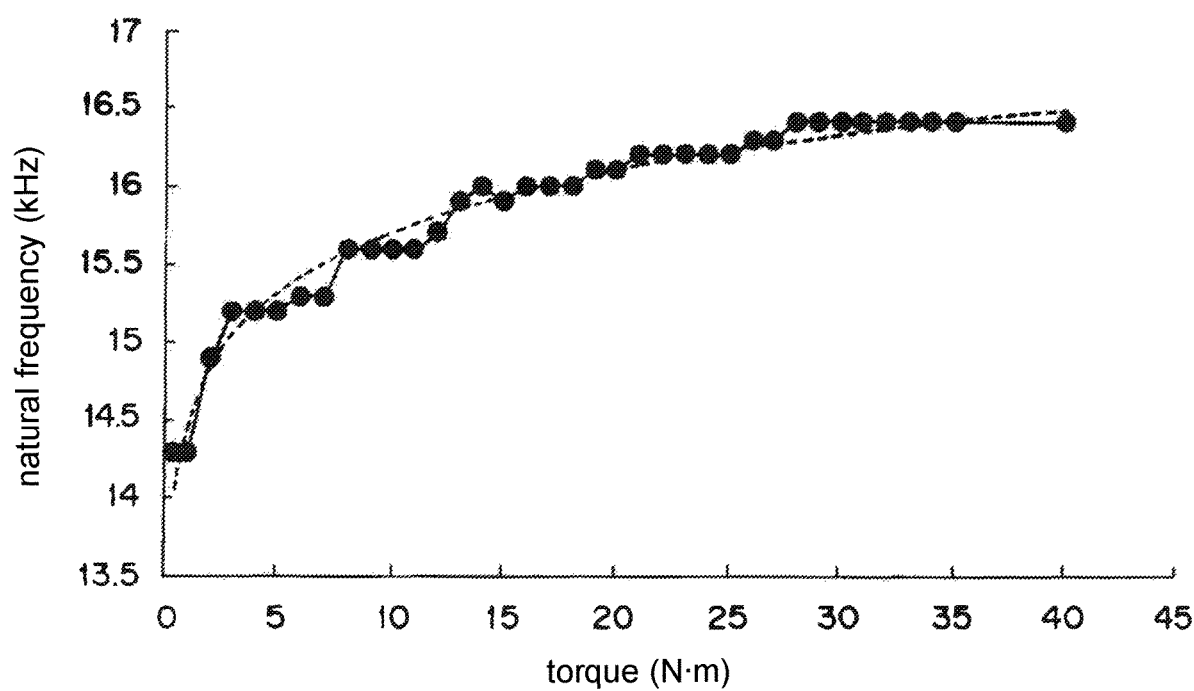

FIG. 6 is a graph which shows a relationship between the gripping force on a certain test piece and the natural frequency of the system including the test piece or a gripper and the like.

As shown in the graph, if the gripping force to the test piece becomes greater, the natural frequency of the system including the test piece or the gripper and the like also becomes greater. In a case with the conditions shown in the graph, if a test force which is necessary for appropriately conducting the material test is set to, for example, 20 (N·m), the natural frequency of the system including the test piece or the gripper and the like should become more than 16 kHz.

With reference to FIG. 4 again, in the appropriate natural frequency measuring process, at the beginning, the test piece 10 is mounted to the upper gripper 21 (step S11). Then, the handle 29 in the upper gripper 21 shown in FIG. 2 is rotated, and the test piece 10 is sandwiched in a state of the appropriate gripping force by the pair of gripper teeth 28. A measurement of the gripping force of the test piece 10 on this occasion can be conducted just once when the tensile test starts, so that the gripping force of the test piece 10 may be measured by using a torque wrench and the like, or be measured by actually applying a tensile test force to the test piece 10.

After the test piece 10 is gripped with the appropriate gripping force (step S12), the upper gripper 21 is batted (step S13). On this occasion, as shown by an arrow in FIG. 2, a lower end of the upper gripper 21 is batted by a hammer and the like toward a direction which is the same as the applying direction of the test force to the test piece 10 during the tensile test, by which a vibration is given.

In addition, a measurement value of a force by the load cell 14 after the batting is measured, and the measurement value is input into the FFT transforming section 41. In the FFT transforming section 41, FFT (Fast Fourier Transform) is performed to the measurement value of the load cell 14. In addition, the natural frequency of the system including the test piece 10 and the upper gripper 21 connected to the load cell 14 is calculated from a peak of a waveform after the FFT (step S14). Here, the FFT, short for fast Fourier transform, is an algorism which fast calculates a discrete Fourier transform in a computer.

The calculated natural frequency of the system including the test piece 10 and the upper gripper 21 connected to the load cell 14 is stored, in the form of the appropriate natural frequency, in the storing section 43 (step S15).

If the preparation processes above are over, the tensile test to the test piece 10 starts. On this occasion, the before-test natural frequency measuring process shown in FIG. 5 is conducted before the test actually starts; the before-test natural frequency measuring process confirms whether the test piece 10 is gripped with the appropriate gripping force by the upper gripper 21.

In the before-test natural frequency measuring process, at first, the test piece 10 to which the test is to be conducted is mounted to the upper gripper 21 (step S21). Then, the upper gripper 21 is batted (step S22). On this occasion, similar to the appropriate natural frequency measuring process, as shown by the arrow in FIG. 2, the lower end of the upper gripper 21 is batted by a hammer and the like toward the direction which is the same as the applying direction of the test force to the test piece 10 during the tensile test.

In addition, the measurement value of the force by the load cell 14 after the batting is measured, and the measurement value is input into the FFT transforming section 41. FFT is performed to the measurement value of the force by the load cell 14 in the FFT transforming section 41, by which the natural frequency of the system including the test piece 10 and the upper gripper 21 connected to the load cell 14 is calculated (step S23).

The natural frequency of the system including the calculated test piece 10 and the upper gripper 21 connected to the load cell 14, served as the before-test natural frequency, is compared with the appropriate natural frequency which is stored in the storing section 43 (step S24). Then, when the measured before-test natural frequency is greater than the stored appropriate natural frequency (step S25), the controlling section 40 allows the starting of the tensile test (step S26). On this occasion, after the lower end of the test piece 10 of which an upper end is gripped by the upper gripper 21 is gripped by the lower gripper 22, the tensile test to the test piece 10 is conducted.

Here, as shown in FIG. 6, if the gripping force to the test piece 10 becomes greater, the natural frequency of the system including the test piece 10 or the upper gripper 21 and the like also becomes greater. Therefore, when the measured before-test natural frequency is greater than the stored appropriate natural frequency, it is judged that the gripping force to the test piece 10 is greater than a lower limit of the appropriate gripping force. Furthermore, an upper limit of the gripping force to the test piece 10 may be determined based on a limit of damage to the test piece 10 and the like.

On the other hand, when the measured before-test natural frequency is smaller than the stored appropriate natural frequency (step S25), a warning display is made to the displaying section 44 (step S27) without the controlling section 40 allowing the start of the tensile test. In this way, the tensile test may be prevented beforehand from starting in a state when the upper end of the test piece 10 is not appropriately gripped. Furthermore, the inappropriateness of the gripping force may be displayed by a warning sound together with the warning display to the displaying section 44 or instead of the warning display to the displaying section 44.

In the embodiment described above, the natural frequency is obtained from the measurement value of the force of the load cell 14. On this occasion, it is possible that a structure which is added to the common material testing machine is not used, so that the natural frequency can be easily calculated. In some cases, instead of using vibration data obtained from the load cell 14, an acceleration sensor and the like are attached to the upper gripper 21 and the natural frequency may also be calculated from the vibration data obtained from acceleration sensor.

In addition, in the embodiment described above, after the appropriate natural frequency measuring process is conducted, the before-test natural frequency measuring process is conducted. However, instead of conducting the appropriate natural frequency measuring process, to each combination of the test piece and the upper gripper, the relationship between the gripping force of the upper gripper and the natural frequency of the system including the test piece or the gripper and the like may be calculated in a way similar to the graph shown in FIG. 6, and the natural frequency which becomes the appropriate gripping force is stored in advance. On this occasion, the appropriate natural frequency which becomes the appropriate gripping force is read from the combination of the test piece and the upper gripper, and is compared with the before-test natural frequency.

The embodiment of the disclosure recited in technical solution 1 is a material testing machine which conducts a tensile test by applying a tensile test force to a test piece in a state when both ends of the test piece are gripped by a pair of grippers, and the material testing machine includes: a storing section, which stores an appropriate natural frequency, wherein a natural frequency of a system including the test piece and one of the pair of grippers when the test piece is gripped with an appropriate gripping force by the one gripper is served as the appropriate natural frequency; a before-test natural frequency measuring means, which measures a before-test natural frequency, wherein a natural frequency of the system including the test piece and the one gripper when the test piece is gripped by the one gripper before the tensile test starts is served as the before-test natural frequency; and a comparing section, which compares the before-test natural frequency with the appropriate natural frequency.

The embodiment of the disclosure recited in technical solution 2 is a material testing machine which conducts a tensile test by applying a tensile test force to a test piece in a state when both ends of the test piece are gripped by a pair of grippers, and measuring the tensile test force with a force detector which is connected to one of the pair of grippers, and the material testing machine includes: a calculating section, which calculates a natural frequency of a system including the test piece and the gripper connected to the force detector, based on a detected value of a force of the force detector when the gripper connected to the force detector is batted; a storing section, which stores an appropriate natural frequency, wherein a natural frequency, calculated by the calculating section, of the system including the test piece and the gripper connected to the force detector when the gripper connected to the force detector is batted in a state when the test piece is gripped with an appropriate gripping force by the gripper connected to the force detector is served as the appropriate natural frequency; and a comparing section compares a before-test natural frequency with the appropriate natural frequency which is stored in the storing section, wherein a natural frequency, calculated by the calculating section, of the system including the test piece and the gripper connected to the force detector when the gripper connected to the force detector is batted in a state when the test piece is gripped by the gripper connected to the force detector before the tensile test starts is served as the before-test natural frequency.

The embodiment of the disclosure recited in technical solution 3 is the material testing machine recited in technical solution 1 or 2, and the material test machine includes: a controlling section which allows the starting of a material test when the before-test natural frequency is greater than the appropriate natural frequency, and conducts a warning display when the before-test natural frequency is smaller than the appropriate natural frequency.

The embodiment of the disclosure recited in technical solution 4 is a gripping force detecting method which detects whether a test piece is gripped with an appropriate gripping force by a pair of grippers in a material testing machine, which conducts a tensile test by applying a tensile test force to the test piece in a state when both ends of the test piece are gripped by the grippers, and the gripping force detecting method includes: an appropriate natural frequency storing process of storing an appropriate natural frequency, wherein a natural frequency of a system including the test piece and one of the pair of grippers when the test piece is gripped with an appropriate gripping force by the one gripper is served as the appropriate natural frequency; a before-test natural frequency measuring process of measuring a before-test natural frequency, wherein a natural frequency of the system including the test piece and the one gripper when the test piece is gripped by the one gripper before the tensile test starts is served as the before-test natural frequency; and a comparing process of comparing the before-test natural frequency with the appropriate natural frequency.

The embodiment of the disclosure recited in technical solution 5 is a gripping force detecting method which detects whether a test piece is gripped with an appropriate gripping force by a pair of grippers in a material testing machine, which conducts a tensile test by applying a tensile test force to the test piece in a state when both ends of the test piece are gripped by the pair of grippers, and by measuring the tensile test force with a force detector which is connected to one of the pair of grippers, and the gripping force detecting method includes: a first measuring process of measuring a detected value of the force of the force detector when the gripper connected to the force detector is batted in a state when the test piece is gripped with an appropriate gripping force by the gripper connected to the force detector; an appropriate natural frequency calculating process of calculating an appropriate natural frequency based on the detected value of the force of the force detector which is measured in the first measuring process, wherein a natural frequency of a system including the test piece and the gripper connected to the force detector is served as the appropriate natural frequency; a second measuring process of measuring a detected value of the force of the force detector when the gripper connected to the force detector is batted in a state when the test piece is gripped by the gripper connected to the force detector before the tensile test starts; a calculating process for a before-test natural frequency of calculating a before-test natural frequency based on the detected value of the force of the force detector which is measured in the second measuring process, wherein a natural frequency of the system including the test piece and the gripper connected to the force detector is served as the before-test natural frequency; and a comparing process of comparing the before-test natural frequency with the appropriate natural frequency.

[Effect]

According to the embodiments of technical solutions 1 to 5, whether the test piece is gripped with the appropriate gripping force by the gripper can be easily judged based on the natural frequency of the system including the test piece and the gripper which is connected to the force detector. Therefore, the structure is simple, the test piece can be appropriately gripped, and a correct material test can be conducted.

According to the embodiment of technical solution 2, whether the gripping force is appropriate is judged based on a vibration data of the force detector which is originally provided on the material testing machine, so that the judgment of whether the gripping force is appropriate can be conducted easily without an additional structure.

According to the embodiment of technical solution 3, only when the test piece is appropriately gripped by the gripper can the test be conducted, and when the gripping force of the gripper is not appropriate, the inappropriateness can be recognized.

In addition, in the embodiments described above, the disclosure is used in the material testing machine which moves the cross head up and down by the pair of screw rods; however, the disclosure can also be used in a material testing machine of other types.

What is claimed is:

1. A material testing machine, which conducts a tensile test by applying a tensile test force to a test piece in a state when both ends of the test piece are gripped by a pair of grippers, comprising:
   a memory, which stores an appropriate natural frequency, wherein a natural frequency of a system comprising the test piece and one of the pair of grippers when the test piece is gripped with an appropriate gripping force by the one gripper is the appropriate natural frequency;
   a before-test natural frequency measuring means, which measures a before-test natural frequency, wherein a natural frequency of the system comprising the test piece and the one gripper when the test piece is gripped by the one gripper before the tensile test starts is the before-test natural frequency;
   a comparing section, which compares the before-test natural frequency with the appropriate natural frequency; and
   a controlling section, which allows the starting of a material test when the before-test natural frequency is greater than the appropriate natural frequency, and conducts a warning display when the before-test natural frequency is smaller than the appropriate natural frequency.

2. A material testing machine, which conducts a tensile test by applying a tensile test force to a test piece in a state when both ends of the test piece are gripped by a pair of grippers, and by measuring the tensile test force with a force detector which is connected to one of the pair of grippers, comprising:
   a calculating section, which calculates a natural frequency of a system comprising the test piece and the gripper connected to the force detector, based on a detected value of a force of the force detector when the gripper connected to the force detector is batted;
   a memory, which stores an appropriate natural frequency, wherein a natural frequency, calculated by the calculating section, of the system comprising the test piece and the gripper connected to the force detector when the gripper connected to the force detector is batted in a state when the test piece is gripped with an appropriate gripping force by the gripper connected to the force detector is the appropriate natural frequency;
   a comparing section, which compares a before-test natural frequency with the appropriate natural frequency which is stored in the memory, wherein a natural frequency, calculated by the calculating section, of the system comprising the test piece and the gripper connected to the force detector when the gripper connected to the force detector is batted in a state when the test piece is gripped by the gripper connected to the force detector before the tensile test starts is the before-test natural frequency; and
   a controlling section which allows the starting of a material test when the before-test natural frequency is greater than the appropriate natural frequency, and conducts a warning display when the before-test natural frequency is smaller than the appropriate natural frequency.

3. A gripping force detecting method, which detects whether a test piece is gripped with an appropriate gripping force by a pair of grippers in a material testing machine, which conducts a tensile test by applying a tensile test force to the test piece in the state when both ends of the test piece are gripped by the grippers, the gripping force detecting method comprising:
   an appropriate natural frequency storing process of storing an appropriate natural frequency, wherein a natural frequency of a system comprising the test piece and one of the pair of grippers when the test piece is gripped with an appropriate gripping force by the one gripper is the appropriate natural frequency;
   a before-test natural frequency measuring process of measuring a before-test natural frequency, wherein a natural frequency of the system comprising the test piece and the one gripper when the test piece is gripped by the one gripper before the tensile test starts is the before-test natural frequency;
   a comparing process of comparing the before-test natural frequency with the appropriate natural frequency;
   a step of allowing the starting of a material test when the before-test natural frequency is greater than the appropriate natural frequency; and
   a step of conducting a warning display when the before-test natural frequency is smaller than the appropriate natural frequency.

4. A gripping force detecting method which detects whether a test piece is gripped with an appropriate gripping force by a pair of grippers in a material testing machine, which conducts a tensile test by applying a tensile test force to the test piece in a state when both ends of a test piece are gripped by the pair of grippers, and by measuring the tensile test force with a force detector which is connected to one of the pair of grippers, the gripping force detecting method comprising:
   a first measuring process of measuring a detected value of the force of the force detector when the gripper connected to the force detector is batted in a state when the test piece is gripped with an appropriate gripping force by the gripper connected to the force detector;
   an appropriate natural frequency calculating process of calculating an appropriate natural frequency based on the detected value of the force of the force detector which is measured in the first measuring process, wherein a natural frequency of a system comprising the test piece and the gripper connected to the force detector is the appropriate natural frequency;
   a second measuring process of measuring a detected value of the force of the force detector when the gripper connected to the force detector is batted in a state when the test piece is gripped by the gripper connected to the force detector before the tensile test starts;
   a before-test natural frequency calculating process of calculating a before-test natural frequency based on the detected value of the force of the force detector which is measured in the second measuring process, wherein a natural frequency the system comprising the test piece and the gripper connected to the force detector is the before-test natural frequency;
   a comparing process of comparing the before-test natural frequency with the appropriate natural frequency; and
   a step of allowing the starting of a material test when the before-test natural frequency is greater than the appropriate natural frequency; and
   a step of conducting a warning display when the before-test natural frequency is smaller than the appropriate natural frequency.

* * * * *